United States Patent
Zeng

(10) Patent No.: US 9,524,303 B2
(45) Date of Patent: Dec. 20, 2016

(54) ELECTRONIC CALCULATING APPARATUS FOR GENERATING AN INTERACTION INDEX MAP OF AN IMAGE, METHOD THEREOF AND NON-TRANSITORY MACHINE-READABLE MEDIUM THEREOF

(71) Applicant: Institute For Information Industry, Taipei (TW)

(72) Inventor: Yi-Chong Zeng, Keelung (TW)

(73) Assignee: Institute For Information Industry, Taipei (TW)

( * ) Notice: Subject to any disclaimer, the term of this patent is extended or adjusted under 35 U.S.C. 154(b) by 80 days.

(21) Appl. No.: 14/551,605

(22) Filed: Nov. 24, 2014

(65) Prior Publication Data

US 2016/0132531 A1    May 12, 2016

(30) Foreign Application Priority Data

Nov. 7, 2014 (TW) .............................. 103138690 A

(51) Int. Cl.
G06K 9/62 (2006.01)
G06F 17/30 (2006.01)
G06K 9/64 (2006.01)

(52) U.S. Cl.
CPC ....... *G06F 17/30244* (2013.01); *G06K 9/6201* (2013.01); *G06K 9/64* (2013.01)

(58) Field of Classification Search
USPC 382/170, 171, 190, 209, 218, 278; 358/453, 462
See application file for complete search history.

(56) References Cited

U.S. PATENT DOCUMENTS 5,465,353 A   11/1995 Hull et al.
6,760,714 B1 * 7/2004 Caid ................. G06F 17/30256
                                                    382/116

(Continued)

FOREIGN PATENT DOCUMENTS

TW    200801990 A    1/2008
TW    200922325 A    5/2009

(Continued)

OTHER PUBLICATIONS

Office Action to the corresponding Taiwanese Patent Application No. 103138690 rendered by the Taiwan Intellectual Property Office (TIPO) on Oct. 6, 2015, 12 pages (including English translation).

*Primary Examiner* — Yosef Kassa
(74) *Attorney, Agent, or Firm* — Skaar Ulbrich Macari, P.A.

(57) ABSTRACT

An electronic calculating apparatus for generating an interaction index map of an image, a method thereof and a non-transitory machine-readable medium thereof are provided. The electronic calculating apparatus includes a database and a processor electrically coupled to the database. The database stores a plurality of reference images. The processor sets at least one feature of the image, selects at least one candidate reference image from the plurality of reference images according to the at least one feature by a matching calculating procedure, transforms the at least one candidate reference image into at least one transformed candidate reference image, and generates a specific interaction index map of the image according to at least one interaction index map of the at least one transformed candidate reference image so that a displaying device executes the corresponding operation according to a user instruction by the specific interaction index map and side-information.

15 Claims, 6 Drawing Sheets

(56) References Cited

U.S. PATENT DOCUMENTS

| | | | |
|---|---|---|---|
| 7,070,872 B2* | 7/2006 | Sugiura | H01M 8/0206 429/434 |
| 7,836,050 B2* | 11/2010 | Jing | G06F 17/30244 382/305 |
| 7,912,827 B2* | 3/2011 | Byers | G06F 17/30265 707/706 |
| 8,463,738 B2* | 6/2013 | Mizuguchi | G06F 17/30657 707/602 |
| 8,631,012 B2* | 1/2014 | Leblang | G06F 17/30265 707/741 |
| 2002/0087538 A1 | 7/2002 | Abdel-Mottaleb et al. | |
| 2007/0286531 A1 | 12/2007 | Fu et al. | |
| 2010/0066860 A1 | 3/2010 | Tsurumi | |
| 2011/0106782 A1 | 5/2011 | Ke et al. | |
| 2013/0195361 A1 | 8/2013 | Deng et al. | |
| 2014/0250120 A1 | 9/2014 | Mei et al. | |

FOREIGN PATENT DOCUMENTS

| | | |
|---|---|---|
| TW | 201027374 A1 | 7/2010 |
| TW | 201128421 A1 | 8/2011 |
| TW | 201331772 A1 | 8/2013 |

* cited by examiner

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 3 | 0 | 0 | 0 | 0 | 0 | 0 |
| 0 | 0 | 2 | 2 | 2 | 2 | 2 | 0 | 0 |
| 0 | 0 | 2 | 0 | 0 | 0 | 2 | 0 | 0 |
| 0 | 0 | 2 | 0 | 0 | 0 | 2 | 0 | 0 |
| 0 | 0 | 2 | 0 | 1 | 0 | 2 | 0 | 0 |
| 0 | 0 | 2 | 0 | 0 | 0 | 2 | 0 | 0 |
| 0 | 0 | 2 | 0 | 0 | 0 | 2 | 0 | 0 |
| 0 | 0 | 2 | 2 | 2 | 2 | 2 | 0 | 0 |
| 0 | 0 | 0 | 0 | 0 | 0 | 0 | 0 | 0 |
| 0 | 0 | 0 | 0 | 0 | 0 | 4 | 0 | 0 |
| 0 | 0 | 0 | 0 | 0 | 0 | 0 | 0 | 0 |
| 0 | 5 | 0 | 0 | 0 | 0 | 0 | 0 | 0 |
| 0 | 0 | 0 | 0 | 0 | 0 | 0 | 0 | 0 |

FIG. 1C

ELECTRONIC CALCULATING APPARATUS FOR GENERATING AN INTERACTION INDEX MAP OF AN IMAGE, METHOD THEREOF AND NON-TRANSITORY MACHINE-READABLE MEDIUM THEREOF

PRIORITY

This application claims priority to Taiwan Patent Application No. 103138690 filed on Nov. 7, 2014, which is hereby incorporated herein by reference in its entirety.

FIELD

The present invention relates to an electronic calculating apparatus for generating an interaction index map of an image, a method thereof and a non-transitory machine-readable medium thereof. More particularly, the present invention creates an interaction index map of an image according to an interaction index map of a reference image, and when a user views the image on an electronic display, information related to the image can be further obtained via the interaction index map.

BACKGROUND

Owing to the advancement of the information science and technologies, information is finding wider applications, and among others, an application for images is to label information corresponding to the images.

However, usually the corresponding information is obtained by the user through clicking a specific button or through retrieving the corresponding information via a searching engine. Unfortunately, clicking a specific button adds to inconveniences to the user, and retrieving the corresponding information via a searching engine can only be accomplished through inputting texts. When an image is retrieved via a searching engine, usually what can be obtained is only overall information of the image instead of detailed contents of the image.

Additionally, in the prior art, contents of an image can be identified in a manner of Augmented Reality (AR). However, this requires use of the image identifying technology, which increases the complexity of the calculations and the power consumption of the electronic calculation apparatus; and because it is only able to take an image of a near object as a kernel, it is impossible to identify a panoramic image.

Of course, manually labeling the message of an image is also known as a conventional technology, but the manual operations are the most time-consuming and are inefficient.

Accordingly, an urgent need exists in the art to provide a solution of automatically generating interaction messages of an image at a low computational complexity.

SUMMARY

An objective of the present invention includes providing an electronic calculating apparatus, a method thereof and a non-transitory machine-readable medium thereof. The present invention in certain embodiments provides a solution of automatically generating an interaction index map of an image, and the interaction index map is used as information for interaction between a user and the image.

To achieve the above objective, certain embodiments of the present invention include an electronic calculating apparatus for generating an interaction index map of an image, which comprises a database and a processor. The database is configured to store a plurality of reference images. The electronic calculating apparatus comprises a database and a processor electrically coupled to the database. The database stores a plurality of reference images. The processor is configured to set at least one feature of an image, select at least one candidate reference image from the plurality of reference images according to the at least one feature through a matching calculating procedure, transform the at least one candidate reference image into at least one transformed candidate reference image, and generate a specific interaction index map of the image according to at least one interaction index map of the at least one transformed candidate reference image so that a displaying device executes a corresponding operation according to a user instruction through use of the specific interaction index map and a piece of side-information.

To achieve the above objective, certain embodiments of the present invention also include a method of generating an interaction index map for use in the electronic calculating apparatus described above. The electronic calculating apparatus comprises a database and a processor electrically coupled to the database, and the database is configured to store a plurality of reference images. The method of generating the interaction index map comprises the following steps of: enabling the processor to set at least one feature of an image and select at least one candidate reference image from the plurality of reference images according to the at least one feature through a matching calculating procedure; enabling the processor to transform the at least one candidate reference image into at least one transformed candidate reference image; and enabling the processor to generate a specific interaction index map of the image according to at least one interaction index map of the at least one transformed candidate reference image so that a displaying device executes a corresponding operation according to a user instruction through use of the specific interaction index map and a piece of side-information.

Additionally, certain embodiments of the present invention include a non-transitory machine-readable medium, which is stored with a computer program. The computer program executes a method of generating an interaction index map after being loaded into an electronic calculating apparatus, and the electronic calculating apparatus has a plurality of reference images stored therein. The method of generating an interaction index map comprises the following steps of: setting at least one feature of an image, and selecting at least one candidate reference image from the plurality of reference images according to the at least one feature through a matching calculating procedure by the electronic calculating apparatus; transforming the at least one candidate reference image into at least one transformed candidate reference image by the electronic calculating apparatus; generating a specific interaction index map of the image according to at least one interaction index map of the at least one transformed candidate reference image so that a displaying device executes a corresponding operation according to a user instruction through use of the specific interaction index map and a piece of side-information.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1C is a schematic view of a specific interaction index map of the image according to the first embodiment of the present invention;

DETAILED DESCRIPTION

In the following description, the present invention will be explained with reference to certain example embodiments thereof. However, these example embodiments are not intended to limit the present invention to any specific examples, embodiments, environment, applications or particular implementations described in these example embodiments. Therefore, description of these example embodiments is only for purpose of illustration rather than to limit the present invention, and the scope of the present invention shall be governed by the claims.

It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1A:
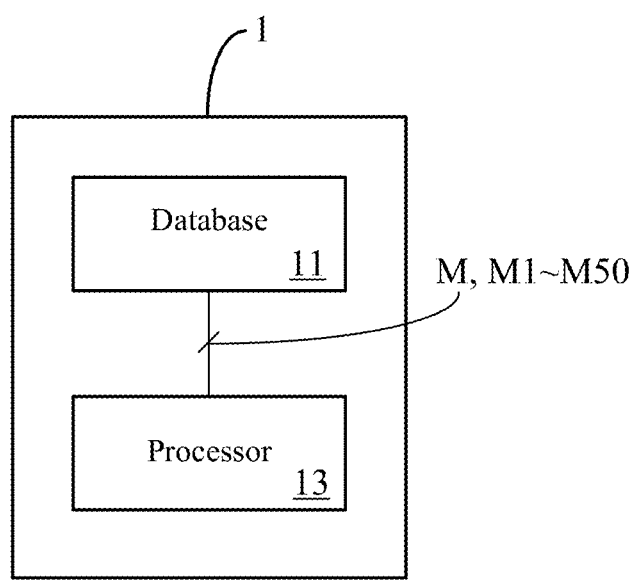
FIG. 1A is a schematic view of an electronic calculating apparatus according to a first embodiment of the present invention.
Figure 1B:
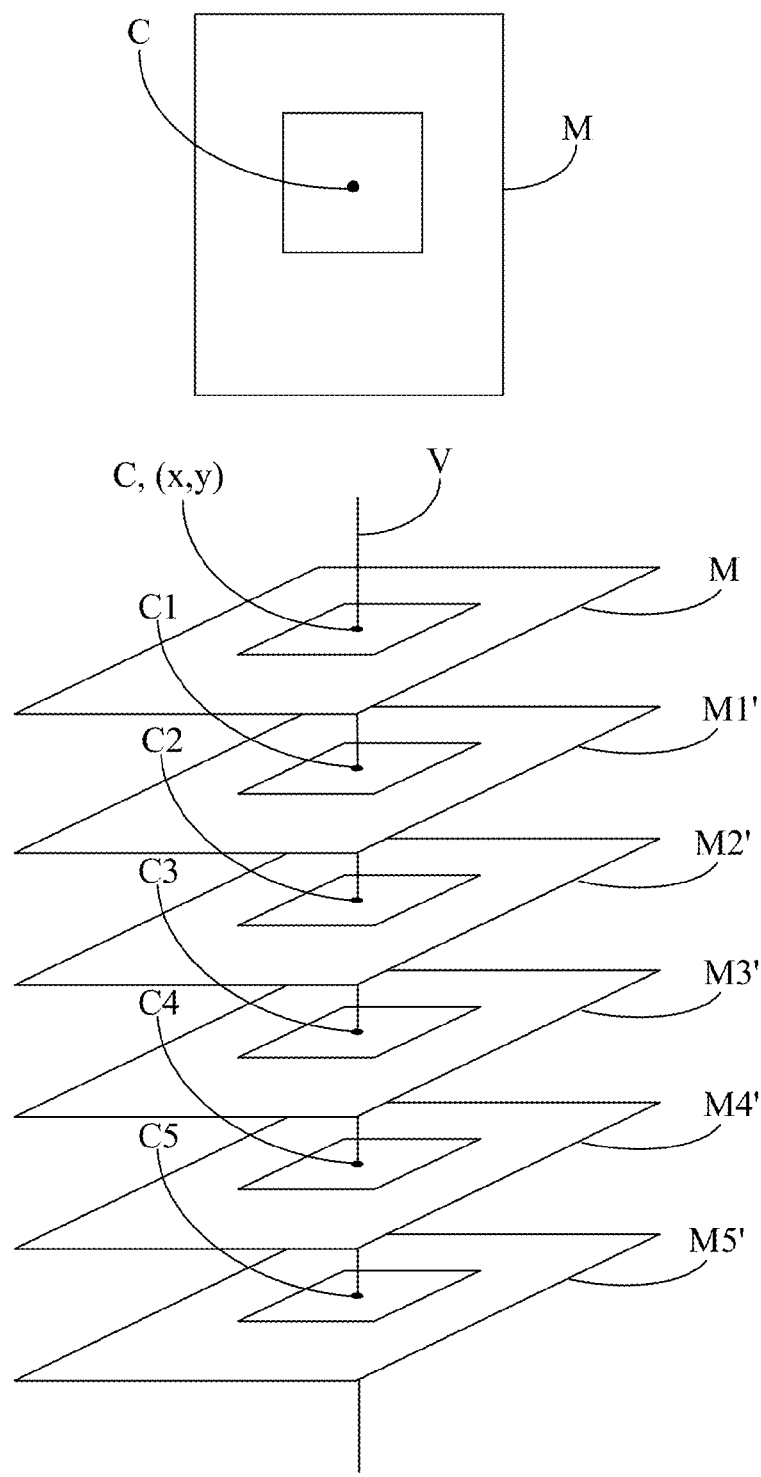
FIG. 1B is a schematic view of an image and a candidate reference image according to the first embodiment of the present invention.

A first embodiment of the present invention is shown in FIGS. 1A~1C. FIG. 1A is a schematic view of an electronic calculating apparatus 1; FIG. 1B is a schematic view of an image M and transformed candidate reference images; and FIG. 1C shows a specific interaction index map of the image M. The electronic calculating apparatus 1 may be a smart phone, a tablet computer, a portable computer, a desk computer, a shared server, a tour guide device, a camera or any other electronic device with the calculating function.

The electronic calculating apparatus 1 comprises a database 11 and a processor 13 electrically coupled to the database 11. The database 11 may be a hard disk or any electronic storage device, which is configured to store a plurality of reference images, and each of the reference images has an interaction index map. The processor 13 may be a microprocessor or any electronic processing device.

In this embodiment, suppose that there are fifty reference images M1~M50 in the database 11. In this case, if a user wants to obtain an image M having a specific interaction index map, then the user transmits the image M without an interaction index map to the electronic calculating apparatus 1. If the electronic calculating apparatus 1 is a camera or some other image capturing device, then it just needs taking a picture to obtain or capture the image M. Next, how the processor 13 generates the specific interaction index map of the image M will be described.

Firstly, the processor 13 selects at least one candidate reference image from the plurality of reference images M1~M50 through a matching calculating procedure.

The matching calculating procedure is accomplished by the processor 13 through the following operations. Firstly, the processor 13 sets the image M to have n feature points, each of which has a feature $V_i$, where i={1,2, . . . n}; and sets the number of the plurality of reference images to be M, with each of the plurality of reference images having $n_j$ feature points and each of the feature points having a feature $U_{j,k}$, where j={1,2, . . . M} and k={1,2, . . . $n_j$}.

Then, the processor 13 calculates a most similar feature point between an $i^{th}$ feature point of the image M and a $j^{th}$ reference image according to the following Equation 1:

$$P_{i,j} = \underset{k=\{1,2,...n_j\}}{\operatorname{argmax}} |SIM(V_i, U_{j,k})| \qquad (1)$$

where, $SIM(V_i, U_{j,k})$ is a similarity between the $i^{th}$ feature point of the image and a $k^{th}$ feature point of a $j^{th}$ reference image. When the processor 13 determines that SIM ($V_i,U_{j,k}$) is not smaller than (larger than or equal to) a first threshold, the processor keeps the $i^{th}$ feature point of the image M and a similarity relationship between the $i^{th}$ feature point of the image M and the $P_{i,j}^{th}$ feature point of the $j^{th}$ reference image; and otherwise, the processor excludes the $i^{th}$ feature point of the image M.

Next, the processor 13 calculates the number of at least one feature point kept between the image M and the $j^{th}$ reference image, and further determines whether the number of feature points is not smaller than a second threshold. If the number of feature points is not smaller than a second threshold, then the processor incorporates the $j^{th}$ reference image into the at least one candidate reference image; and otherwise, the $j^{th}$ reference image will not be incorporated into the at least one candidate reference image.

It should be particularly appreciated that, the matching calculating procedure is not limited to what described above, and other matching calculating procedures that can be used among the images all fall within the scope of the present invention. For example, in other implementations, Equation 1 may be modified into $$P_{i,j} = \underset{k=\{1,2,...n_j\}}{\operatorname{argmin}} |SIM(V_i, U_{j,k})|$$

to calculate a most dissimilar feature point of the $j^{th}$ reference image. Then, the processor 13 determines whether $SIM(V_i,U_{j,P_{i,j}})$ is not larger than (smaller than or equal to) a third threshold. If $SIM(V_i, U_{j,P_{i,j}})$ is not larger than (smaller than or equal to) the third threshold, then the processor 13 accumulates the number of the most dissimilar feature points. If the number of the most dissimilar feature points is larger than a fourth threshold, then the processor 13 determines that the $j^{th}$ reference image is dissimilar to the image M and excludes the $j^{th}$ reference image from the plurality of reference images M1~M50. After all the plurality of reference images M1~M50 have been substituted into $$P_{i,j} = \underset{k=\{1,2,...n_j\}}{\operatorname{argmin}} |SIM(V_i, U_{j,k})|,$$

the dissimilar reference images can be excluded and the remaining reference images may be used as the at least one candidate reference image.

Suppose that through the matching calculating procedure described above, the processor 13 has selected the reference images M1~M5 as the at least one candidate reference image from the plurality of reference images M1~M50. In this case, the at least one candidate reference image M1~M5 are named as a first candidate reference image M1, a second candidate reference image M2, a third candidate reference image M3, a fourth candidate reference image M4 and a fifth candidate reference image M5 respectively. Then, the processor 13 transforms the first to the fifth candidate reference images M1~M5 according to the following Equation 2:

$$\begin{bmatrix} u_i \\ v_i \end{bmatrix} = s \begin{bmatrix} \cos\theta & 0 \\ 0 & \sin\theta \end{bmatrix} \begin{bmatrix} x_j \\ y_j \end{bmatrix} + \begin{bmatrix} f_x \\ f_y \end{bmatrix} \quad (2)$$

where, $(u_i, v_i)$ is a coordinate of an $i^{th}$ feature point of the image M, $(x_j, y_j)$ is a coordinate of the $j^{th}$ feature of one of the first to the fifth candidate reference images M1~M5, and s, θ, $f_x$ and $f_y$ are a scale parameter, a rotation angle parameter, a horizontal shifting parameter and a vertical shifting parameter between the coordinate $(u_i, v_i)$ of the $i^{th}$ feature point of the image and the coordinate $(x_j, y_j)$ of the $j^{th}$ feature of one of the at least one candidate reference image. After each of the parameters described above is derived, the processor 13 transforms all the pixels of the first to the fifth candidate reference images M1~M5, including the pixels of the at least one feature point.

As shown in FIG. 1B, suppose that the center point C is a first feature point of the image M, and the first to the fifth candidate reference images M1~M5 are transformed into a first to a fifth transformed candidate reference images M1'~M5' after transformation. Then, the center point C of the image M is located on the same vertical line V as each of the $j^{th}$ feature points (i.e., center points C1~C5) of the first to the fifth transformed candidate reference images M1'~M5'.

It should be appreciated that, in other implementations where the rotation angle parameter θ does not exist between the image M and the first to the fifth candidate reference images M1~M5 (i.e., when θ=0), the processor 13 transforms the first to the fifth candidate reference images M1~M5 according to the following Equation 3:

$$\begin{bmatrix} s \\ f_x \\ f_y \end{bmatrix} = \begin{bmatrix} x_1^2 + y_1^2 & x_1 & y_1 \\ x_2^2 + y_2^2 & x_2 & y_2 \\ \vdots & \vdots & \vdots \\ x_N^2 + y_N^2 & x_N & y_N \end{bmatrix}^{-1} \begin{bmatrix} x_1 u_1 + y_1 v_1 \\ x_2 u_2 + y_2 v_2 \\ \vdots \\ x_N u_N + y_N v_N \end{bmatrix} \quad (3)$$

After the first to the fifth candidate reference images M1~M5 have been transformed, the interaction index map thereof are transformed accordingly.

It should be firstly appreciated that, the interaction index map needs to operate under the assistance of a piece of side-information, and the side-information is configured to record the messages represented by each of the index values. As shown in the following Table 1, a piece of side-information is a table in this embodiment.

TABLE 1

| Index value | Attribute | Content |
|---|---|---|
| 1 | Text | Center point |
| 2 | Hyperlink | xxxxx |
| 3 | Picture | *.jpg |
| 4 | Film | *.MP4 |

The content of Table 1 may comprise the index values and the attributes and contents corresponding to each of the index values. However, Table 1 is provided only for purpose of instantiation rather than for limitation.

Then, the processor 13 sets $A_i$ to be a corresponding interaction index map of an $i^{th}$ transformed candidate reference image (one of the first to the fifth transformed candidate reference images M1'~M5'), $A_i(x,y)$ to be an index value of a coordinate (x,y) on the corresponding interaction index map of the $i^{th}$ transformed candidate reference image, and B(x,y) to be an index value of the image M on the same coordinate (x,y). The coordinate y) is a pixel of the $i^{th}$ transformed candidate reference image. Then, B(x,y) is calculated according to the following Equation 4:

$$B(x, y) = \underset{c=\{1,2,\ldots,L\}}{\operatorname{argmax}} \; p(c) \quad (4)$$

Here, supposing that L is the total number of types of index values in the side-information and c represents each of the index values, then p(c) is an accumulated number of the index values. Suppose that there are m candidate reference images, and there are m index values at the coordinate (x,y).

For example, taking Table 1 as an example in this embodiment, there are four types of index values (the index values c in Table 1 are 1, 2, 3 and 4 respectively) and five (transformed) candidate reference images (i.e., the first to the fifth transformed candidate reference images M1'~M5'), so L=4 and m=5. Supposing that the index values (i.e., c) of the center points C1~C5 are 1, 2, 1, 3, 1 of Table 1 respectively, then p(1)=3, p(2)=1, p(3)=1, p(4)=0. The accumulated number p(1) corresponding to the index value 1 is the highest value of 3, so the value when c is 1 is selected as B(x,y). Thus, the corresponding index value of the center point C of the image M is 1.

However, the present invention is not limited thereto, and in other implementations, the processor 13 may firstly normalize p(c), and then compare the normalized accumulated numbers with each other to select a corresponding index value of the highest normalized accumulated value as the value of B(x,y).

Of course, the index value of each pixel of the transformed candidate reference image is used as an index value reference of each pixel of the image M, so all the coordinates on the image M have index values which, together with the corresponding index value of the center point C of the image M, form the specific interaction index map of the image M. For the specific interaction index map of the image M as shown in FIG. 1C, each box represents a pixel at each of the coordinates of the image M, and the value in the box is just the corresponding index value.

In this embodiment, the pixel having no corresponding index value in the first to the fifth transformed candidate reference images M1'~M5' has a preset value 0, so if the situation where the accumulated number of index values of one or more pixels is p(0)=5 also takes place after the image M makes references to the transformed first to fifth candidate reference images M1'~M5', then 0 is just the index value of the one or more pixels of the image M.

After the specific interaction index map of the image M is created by the processor 13, the user may use a displaying device (not depicted) to generate a touch signal by means of a user instruction, for example, by moving a mouse cursor to a specific position corresponding to the index value on the image M or by slightly touching the specific position with a finger (if the displaying device is a touch screen). Then, the displaying device executes a corresponding operation according to the user instruction and through use of the specific interaction index map and the piece of side-information.

The corresponding operation is to display the texts "center point" if the corresponding index value is the value 1 in Table 1, and is to perform network connection if the corresponding index is the value 2. Here, the displaying device is an element of the electronic calculating apparatus 1 and is electrically coupled to the processor 13; or the displaying device is some other electronic displaying device separate from the electronic calculating apparatus 1.

Figure 2A:
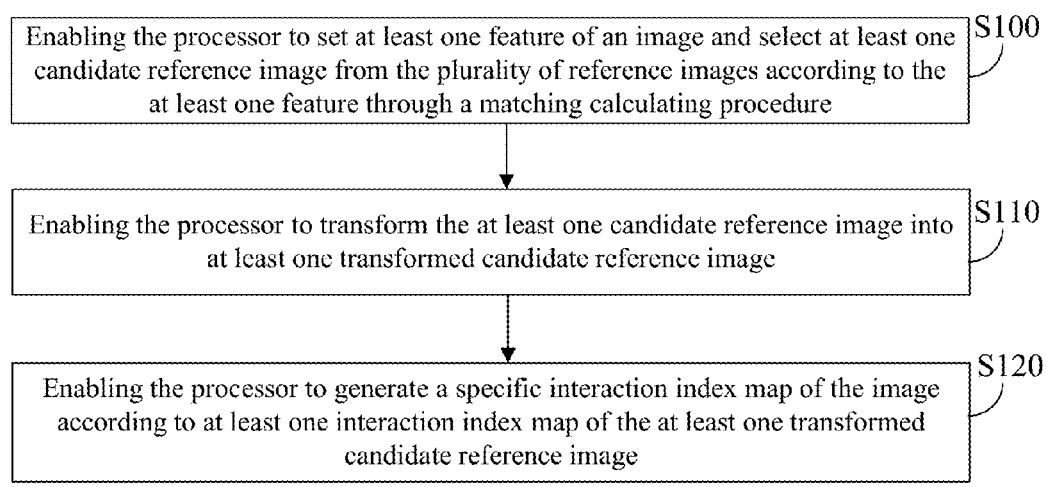
FIG. 2A is a flowchart diagram of a method of generating an interaction index map according to a second embodiment of the present invention.
Figure 2B:
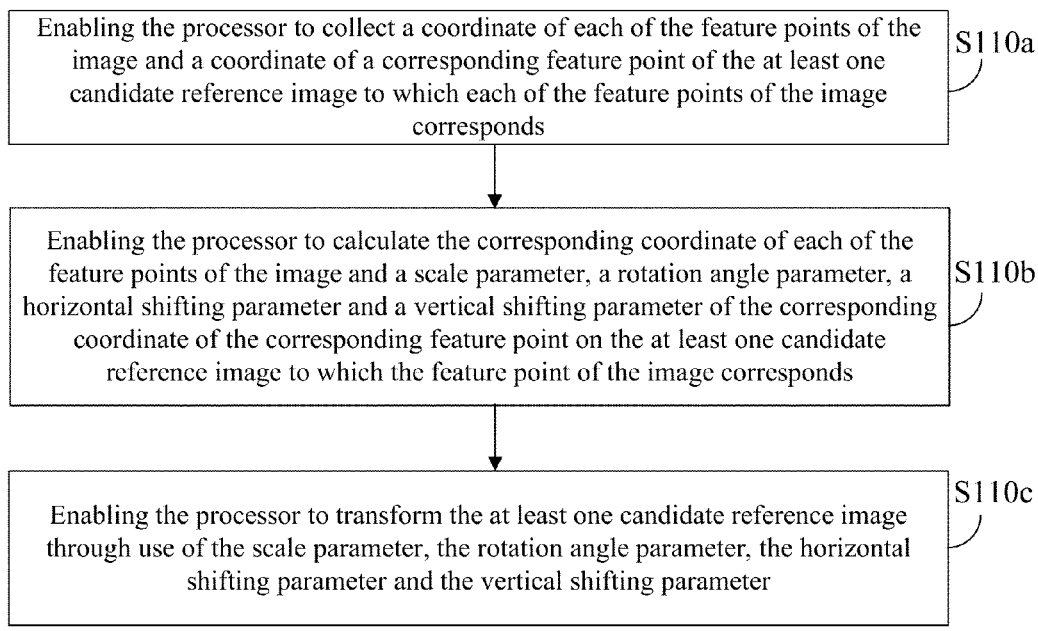
FIG. 2B is a detailed flowchart diagram of the method of generating an interaction index map according to the second embodiment of the present invention.
Figure 2C:
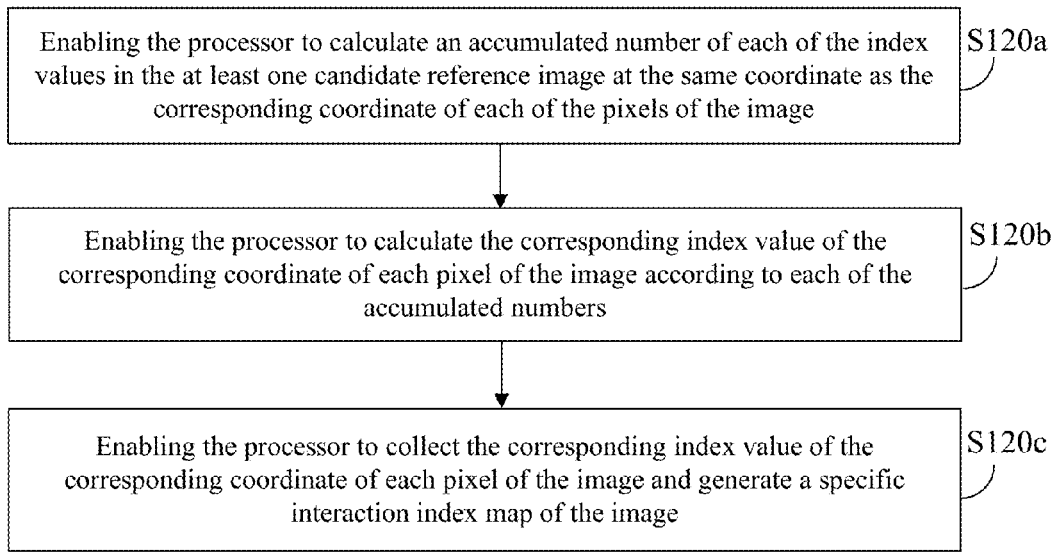
FIG. 2C is a detailed flowchart diagram of the method of generating an interaction index map according to the second embodiment of the present invention.

A second embodiment of the present invention is shown in FIG. 2A, FIG. 2B and FIG. 2C. FIG. 2A is a flowchart diagram of a method of generating an interaction index map, and FIG. 2B and FIG. 2C are detailed flowchart diagrams of the method of generating an interaction index map. The method of generating an interaction index map described in this embodiment is used in an electronic calculating apparatus, for example, the electronic calculating apparatus 1 of the first embodiment. The electronic calculating apparatus comprises a database and a processor electrically coupled to the database. The method of generating an interaction index map is executed by the processor.

In this embodiment, suppose that the database has fifty reference images stored therein. In this case, if a user wants to obtain an image having a specific interaction index map, the user transmits the image without an interaction index map to the electronic calculating apparatus. If the electronic calculating apparatus is a camera or some other image retrieving device, then it just needs taking a pictures to obtain or capture the image M. Next, how the processor generates the specific interaction index map of the image will be described.

Firstly, in the method of generating an interaction index map, a step S100 is executed to enable the processor to set at least one feature of an image, and select at least one candidate reference image from the plurality of reference images according to the at least one feature through a matching calculating procedure.

In the matching calculating procedure, firstly the processor sets the image to have n feature points, each of which has a feature $V_i$ of a length, where $i=\{1,2,\ldots n\}$; and sets the number of the plurality of reference images to be M, with each of the plurality of reference images having $n_j$ feature points and each of the feature points having a feature $U_{j,k}$, where $j=\{1,2,\ldots M\}$ and $k=\{1,2,\ldots n_j\}$.

Then, the processor calculates a most similar feature point between an $i^{th}$ feature point of the image and a $j^{th}$ reference image according to Equation 1 of the first embodiment, and further determines whether to keep the $i^{th}$ feature point of the image and a similarity relationship between the $i^{th}$ feature point of the image and the $P_{i,j}^{th}$ feature point of the $j^{th}$ reference image and determines the number of at least one feature point kept between the image and the $j^{th}$ reference image. Because Equation 1 has already been described in the first embodiment, it will not be further described herein.

Of course, this equation may also be modified into $$P_{i,j} = \underset{k=\{1,2,\ldots,n_j\}}{\operatorname{argmin}} |SIM(V_i, U_{j,k})|$$

so as to calculate a most dissimilar feature point of the $j^{th}$ reference image. Then, the processor determines whether $SIM(V_i, U_{j,P_{i,j}})$ is not larger than (smaller than or equal to) a fifth threshold, and accumulates the number of the most dissimilar feature points if it is determined that $SIM(V_i, U_{j,P_{i,j}})$ is not larger than (smaller than or equal to) the fifth threshold. Further, if the number of the most dissimilar feature points is larger than a sixth threshold, the processor 13 determines that the $j^{th}$ reference image is dissimilar to the image M and excludes the $j^{th}$ reference image from the plurality of reference images. After all the plurality of reference images M1~M50 have been substituted into $$P_{i,j} = \underset{k=\{1,2,\ldots n_j\}}{\operatorname{argmin}} |SIM(V_i, U_{j,k})|,$$

the dissimilar reference images can be excluded and the remaining reference images may be used as the at least one candidate reference image.

In this embodiment, suppose that through the matching calculating procedure described above, the processor has selected from the plurality of reference images five reference images as the at least one candidate reference image, namely, a first candidate reference image, a second candidate reference image, a third candidate reference image, a fourth candidate reference image and a fifth candidate reference image respectively.

Afterwards, a step S110 is executed to enable the processor to transform the at least one candidate reference image into at least one transformed candidate reference image. As shown in FIG. 2B, the step S110 further comprises steps S110a, S110b and S110c. Specifically, the step S110a is executed to enable the processor to collect a coordinate of each of the feature points of the image and a coordinate of a corresponding feature point of the first to the fifth candidate reference images to which each of the feature points of the image corresponds, so the number of the coordinates of the feature points of the image is at least one.

The step S110b is executed to enable the processor to calculate the corresponding coordinate of each of the feature points of the image and the transformation parameters s, θ, $f_x$ and $f_y$ of the corresponding coordinate of the corresponding feature point on the first to the fifth candidate reference images to which each of the feature points of the image corresponds. s, θ, $f_x$ and $f_y$ are a scale parameter, a rotation angle parameter, a horizontal shifting parameter and a vertical shifting parameter respectively.

Afterwards, the step S110c is executed to enable the processor to transform the first to the fifth candidate reference images respectively through use of the scale parameter, the rotation angle parameter, the horizontal shifting parameter and the vertical shifting parameter. It should be appreciated that, the processor transforms all the pixels of the first to the fifth candidate reference images, including the pixels of the at least one feature point.

Generally speaking, the processor performs the transformations according to Equation 2 of the first embodiment. However, if the corresponding coordinate of each of the feature points of the image and the corresponding coordinate of the corresponding feature point on the first to the fifth candidate reference images to which each of the feature points corresponds do not have the rotation angle parameter θ (i.e., the rotation angle parameter is zero), then the processor performs the transformations according to Equation 3.

It should be appreciated that, how to execute the steps S110a~S110c described above can be known by those skilled in the art, so the details thereof will not be further described.

Afterwards, a step S120 is executed to enable the processor to generate a specific interaction index map of the image according to at least one interaction index map of the at least one transformed candidate reference image so that a displaying device executes a corresponding operation according to a user instruction through use of the specific interaction index map and a piece of side-information.

Further speaking, as shown in FIG. 2C, the step S120 further comprises steps S120a, S120b and S120c. Specifically, the step S120a is executed to enable the processor to calculate an accumulated number of each of the index values in the at least one candidate reference image at the same coordinate as the corresponding coordinate of each of the pixels of the image. In other words, the processor accumulates the index values for each pixel of the image.

The step S120b is executed to enable the processor to calculate the corresponding index value of the corresponding coordinate of each pixel of the image according to each of the accumulated numbers and through use of Equation 4 of the first embodiment.

However, the present invention is not limited thereto, and in other implementations, the processor may firstly normalize the accumulated number p(c) in Equation 4 of the first embodiment, and then compare the normalized accumulated numbers with each other to select an index value corresponding to the highest normalized accumulated value as a numeric value of the corresponding index value B(x,y) in Equation 4 of the first embodiment.

The step S120c is executed to enable the processor to collect the corresponding index value of the corresponding coordinate of each pixel of the image and generate a specific interaction index map of the image.

It should be appreciated that, how to perform the steps S120a~S120c described above can be known by those skilled in the art, so the details thereof will not be further described herein.

After the specific interaction index map of the image is created by the processor, the user may use a displaying device to generate a touch signal by means of a user instruction, for example, by moving a mouse cursor to a specific position corresponding to the index value on the image or by slightly touching the specific position with a finger (if the displaying device is a touch screen). Then, the displaying device executes a corresponding operation according to the user instruction and through use of the specific interaction index map and the piece of side-information.

It should be appreciated that, the way in which the steps S100~S120 described above is just as defined in the first embodiment and, thus, this will not be further described herein.

In addition to the aforesaid steps, the method of generating an interaction index map of this embodiment can also execute all the operations and have all the functions that are described in the first embodiment. Because how the method of generating an interaction index map of this embodiment executes these operations and have these functions can be readily known by those of ordinary skill in the art of the present invention based on the first embodiment, this will not be further described herein.

Furthermore, the method of generating an interaction index map of the second embodiment may be implemented by a non-transitory machine-readable medium which is stored with a computer program. When the computer program is loaded into an electronic calculating apparatus, a plurality of codes comprised therein is executed, and the method of generating an interaction index map of the second embodiment will be accomplished. The non-transitory machine-readable mediums may be a file that can be transmitted in a network, or may be a non-transitory tangible computer readable storage medium, such as a read only memory (ROM), a flash memory, a floppy disk, a hard disk, a compact disk (CD), a mobile disk, a magnetic tape, a database accessible to networks, or any other storage media with the same function and well known to those skilled in the art.

According to the above descriptions, the electronic calculating apparatus, the method of generating an interaction index map and a non-transitory machine-readable medium thereof of the present invention automatically generate an interaction index map of an image through image matching. As compared to the conventional way of labeling information of the image, the present invention can decrease the complexity of the calculations and increase the efficiency.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An electronic calculating apparatus, comprising:
   a database, storing an image to be displayed and a plurality of reference images therein; and
   a processor electrically coupled to the database, being configured to set at least one feature of the image, select at least one candidate reference image from the plurality of reference images by matching respective feature of each of the reference image to the at least one feature of the image through a matching calculating procedure, transform the at least one candidate reference image into at least one transformed candidate reference image, and generate a specific interaction index map including a plurality of boxes with respective index values corresponding to pixels of the image according to at least one interaction index map including those corresponding to pixels of the at least one transformed candidate reference image so that a displaying device executes a corresponding operation according to a user instruction through use of the specific interaction index map and a piece of side-information.

2. The electronic calculating apparatus of claim 1, wherein the matching calculating procedure comprises the following operations:
   setting the image to have n feature points by the processor, wherein each of the feature points of the image has a feature $V_i$, where $i=\{1,2,\ldots n\}$;
   setting the number of the plurality of reference images to be M by the processor, wherein each of the plurality of reference images has $n_j$ feature points, each of the feature points of each of the plurality of reference images has a feature $U_{j,k}$, where $j=\{1,2,\ldots M\}$ and $k=\{1,2,\ldots n_j\}$;
   calculating a most similar feature point between an $i^{th}$ feature point of the image and a $j^{th}$ reference image to be $$P_{i,j} = \underset{k=\{1,2,\ldots n_j\}}{\operatorname{argmax}} |SIM(V_i, U_{j,k})|$$

by the processor, where $SIM(V_i,U_{j,k})$ is a similarity between each of the feature points of the image and each of the feature points of each of the plurality of reference images;

determining that $SIM(V_i,U_{j,P_{i,j}})$ is not smaller than a first threshold, and keeping the $i^{th}$ feature point of the image and a similarity relationship between the $i^{th}$ feature point of the image and the $P_{i,j}^{th}$ feature point of the $j^{th}$ reference image by the processor; and calculating the number of at least one feature point kept between the image and the $j^{th}$ reference image by the processor, and incorporating the $j^{th}$ reference image into the at least one candidate reference image by the processor if it is determined that the number of feature points is not smaller than a second threshold.

3. The electronic calculating apparatus of claim 1, wherein the processor transforms the at least one candidate reference image according to the following equation:

$$\begin{bmatrix} u_i \\ v_i \end{bmatrix} = s \begin{bmatrix} \cos\theta & 0 \\ 0 & \sin\theta \end{bmatrix} \begin{bmatrix} x_j \\ y_j \end{bmatrix} + \begin{bmatrix} f_x \\ f_y \end{bmatrix};$$

where, $(u_i,v_i)$ is a coordinate of an $i^{th}$ feature point of the image, $(x_j,y_j)$ is a coordinate of a $j^{th}$ feature of one of the at least one candidate reference image, s, θ, $f_x$ and $f_y$ are a scale parameter, a rotation angle parameter, a horizontal shifting parameter and a vertical shifting parameter between the coordinate $(u_i,v_i)$ of the $i^{th}$ feature point of the image and the coordinate $(x_j,y_j)$ of the $j^{th}$ feature of one of the at least one candidate reference image.

4. The electronic calculating apparatus of claim 1, wherein the processor transforms the at least one candidate reference image according to the following equation:

$$\begin{bmatrix} s \\ f_x \\ f_y \end{bmatrix} = \begin{bmatrix} x_1^2+y_1^2 & x_1 & y_1 \\ x_2^2+y_2^2 & x_2 & y_2 \\ \vdots & \vdots & \vdots \\ x_N^2+y_N^2 & x_N & y_N \end{bmatrix}^{-1} \begin{bmatrix} x_1 u_1 + y_1 v_1 \\ x_2 u_2 + y_2 v_2 \\ \vdots \\ x_N u_N + y_N v_N \end{bmatrix}$$

where, $(u_i,v_i)$ is a coordinate of an $i^{th}$ feature point of the image, $(x_j,y_j)$ is a coordinate of a $j^{th}$ feature of one of the at least one candidate reference image, s, $f_x$ and $f_y$ are a scale parameter, a horizontal shifting parameter and a vertical shifting parameter between the coordinate $(u_i,v_i)$ of the $i^{th}$ feature point of the image and the coordinate $(x_j,y_j)$ of the $j^{th}$ feature of one of the at least one candidate reference image.

5. The electronic calculating apparatus of claim 1, wherein the processor generates the specific interaction index map of the image according to the following equation:

$$B(x,y) = \underset{c=\{1,2,\ldots,L\}}{\operatorname{argmax}} p(c);$$

where, B(x,y) is a corresponding index value of a coordinate on the specific interaction index map, (x,y) is the coordinate, L is the total number of types of index values, c is an index value of at least one transformed candidate reference image at the coordinate, and p(c) is an accumulated number of the index values.

6. A method of generating an interaction index map for use in an electronic calculating apparatus, the electronic calculating apparatus comprising a database and a processor electrically coupled to the database, and the database being configured to store an image to be displayed and a plurality of reference images therein, the method of generating an interaction index map comprising:

the processor setting at least one feature of the image and selecting at least one candidate reference image from the plurality of reference images by matching respective feature of each of the reference image to the at least one feature of the image through a matching calculating procedure;

the processor transforming the at least one candidate reference image into at least one transformed candidate reference image; and the processor generating a specific interaction index map including a plurality of boxes with respective index values corresponding to pixels of the image according to at least one interaction index map including those corresponding to pixels of the at least one transformed candidate reference image so that a displaying device executes a corresponding operation according to a user instruction through use of the specific interaction index map and a piece of side-information.

7. The method of generating an interaction index map of claim 6, wherein the matching calculating procedure further comprises:

the processor setting the image to have n feature points, wherein each of the feature points of the image has a feature $V_i$, where $i=\{1,2,\ldots n\}$;

the processor setting the number of the plurality of reference images to be M, wherein each of the plurality of reference images has $n_j$ feature points, each of the feature points of each of the plurality of reference images has a feature $U_{j,k}$, where $j=\{1,2,\ldots M\}$ and $k=\{1,2,\ldots n_j\}$;

the processor calculating a most similar feature point between an $i^{th}$ feature point of the image and a $j^{th}$ reference image to be $$P_{i,j} = \underset{k=\{1,2,\ldots n_j\}}{\operatorname{argmax}} |SIM(V_i, U_{j,k})|,$$

where $SIM(V_i,U_{j,k})$ is a similarity between each of the feature points of the image and each of the feature points of each of the plurality of reference images;

the processor determining that $SIM(V_i, U_{j,P_{i,j}})$ is not smaller than a first threshold, and keeping the $i^{th}$ feature point of the image and a similarity relationship between the $i^{th}$ feature point of the image and the $P_{i,j}^{th}$ feature point of the $j^{th}$ reference image; and the processor calculating the number of at least one feature point kept between the image and the $j^{th}$ reference image, and incorporating the $j^{th}$ reference image into the at least one candidate reference image if it is determined that the number of feature points is not smaller than a second threshold.

8. The method of generating an interaction index map of claim 6, wherein the processor transforms the at least one candidate reference image according to the following equation:

$$\begin{bmatrix} u_i \\ v_i \end{bmatrix} = s \begin{bmatrix} \cos\theta & 0 \\ 0 & \sin\theta \end{bmatrix} \begin{bmatrix} x_j \\ y_j \end{bmatrix} + \begin{bmatrix} f_x \\ f_y \end{bmatrix};$$

where, $(u_i,v_i)$ is a coordinate of an $i^{th}$ feature point of the image, $(x_j,y_j)$ is a coordinate of a $j^{th}$ feature of one of the at least one candidate reference image, s, θ, $f_x$ and $f_y$ are a scale parameter, a rotation angle parameter, a horizontal shifting parameter and a vertical shifting parameter between the coordinate $(u_i,v_i)$ of the $i^{th}$ feature point of the image and the coordinate $(x_j,y_j)$ of the $j^{th}$ feature of one of the at least one candidate reference image.

9. The method of generating an interaction index map of claim 6, wherein the processor transforms the at least one candidate reference image according to the following equation:

$$\begin{bmatrix} s \\ f_x \\ f_y \end{bmatrix} = \begin{bmatrix} x_1^2 + y_1^2 & x_1 & y_1 \\ x_2^2 + y_2^2 & x_2 & y_2 \\ \vdots & \vdots & \vdots \\ x_N^2 + y_N^2 & x_N & y_N \end{bmatrix}^{-1} \begin{bmatrix} x_1 u_1 + y_1 v_1 \\ x_2 u_2 + y_2 v_2 \\ \vdots \\ x_N u_N + y_N v_N \end{bmatrix}$$

where, $(u_i,v_i)$ is a coordinate of an $i^{th}$ feature point of the image, $(x_j,y_j)$ is a coordinate of a $j^{th}$ feature of one of the at least one candidate reference image, s, $f_x$ and $f_y$ are a scale parameter, a horizontal shifting parameter and a vertical shifting parameter between the coordinate $(u_i,v_i)$ of the $i^{th}$ feature point of the image and the coordinate $(x_j,y_j)$ of the $j^{th}$ feature of one of the at least one candidate reference image.

10. The method of generating an interaction index map of claim 6, wherein the processor generates the specific interaction index map of the image according to the following equation:

$$B(x, y) = \underset{c=\{1,2,\ldots,L\}}{\operatorname{argmax}} \ p(c);$$

where, B(x,y) is a corresponding index value of a coordinate on the specific interaction index map, (x,y) is the coordinate, L is the total number of types of index values, c is an index value of at least one transformed candidate reference image at the coordinate, and p(c) is an accumulated number of the index values.

11. A non-transitory machine-readable medium, being stored with a computer program, the computer program comprising a plurality of codes, a method of generating an interaction index map being executed after the plurality of codes being loaded into an electronic calculating apparatus, the electronic calculating apparatus having an image to be displayed and a plurality of reference images stored therein, and the plurality of codes comprising:
a code A for enabling the electronic calculating apparatus to set at least one feature of the image, and select at least one candidate reference image from the plurality of reference images by matching respective feature of each of the reference image to the at least one feature of the image through a matching calculating procedure;
a code B for enabling the electronic calculating apparatus to transform the at least one candidate reference image into at least one transformed candidate reference image; and
a code C for enabling the electronic calculating apparatus to generate a specific interaction index map including a plurality of boxes with respective index values corresponding to pixels of the image according to at least one interaction index map including those corresponding to pixels of the at least one transformed candidate reference image so that a displaying device executes a corresponding operation according to a user instruction through use of the specific interaction index map and a piece of side-information.

12. The non-transitory machine-readable medium of claim 11, wherein the plurality of codes further comprising:
a code A1 for enabling the electronic calculating apparatus to set the image to have n feature points, wherein each of the feature points of the image has a feature $V_i$, where i={1,2, . . . n};
a code A2 for enabling the electronic calculating apparatus to set the number of the plurality of reference images to be M, wherein each of the plurality of reference images has $n_j$ feature points, each of the feature points of each of the plurality of reference images has a feature $U_{j,k}$, where j={1,2, . . . M} and k={1,2, . . . $n_j$};
a code A3 for enabling the electronic calculating apparatus to calculate an $i^{th}$ feature point of the image and a most similar feature point of a $j^{th}$ reference image as $$P_{i,j} = \underset{k=\{1,2,\ldots n_j\}}{\operatorname{argmax}} \ |SIM(V_i, U_{j,k})|,$$

where SIM $(V_i,U_{j,k})$ is a similarity between each of the feature points of the image and each of the feature points of each of the plurality of reference images;
a code A4 for enabling the electronic calculating apparatus to determine that $SIM(V_i, U_{j,P_{i,j}})$ is not smaller than a first threshold, and keep the $i^{th}$ feature point of the image and a similarity relationship between the $i^{th}$ feature point of the image and the $P_{i,j}^{th}$ feature point of the $j^{th}$ reference image; and
a code A5 for enabling the electronic calculating apparatus to calculate the number of at least one feature point kept between the image and the $j^{th}$ reference image, and incorporate the $j^{th}$ reference image into the at least one candidate reference image by the electronic calculating apparatus if it is determined that the number of feature points is not smaller than a second threshold.

13. The non-transitory machine-readable medium of claim 11, wherein the electronic calculating apparatus transforms the at least one candidate reference image according to the following equation:

$$\begin{bmatrix} u_i \\ v_i \end{bmatrix} = s \begin{bmatrix} \cos\theta & 0 \\ 0 & \sin\theta \end{bmatrix} \begin{bmatrix} x_j \\ y_j \end{bmatrix} + \begin{bmatrix} f_x \\ f_y \end{bmatrix};$$

where, $(u_i,v_i)$ is a coordinate of an $i^{th}$ feature point of the image, $(x_j,y_j)$ is a coordinate of a $j^{th}$ feature of one of the at least one candidate reference image, s, θ, $f_x$ and $f_y$ are a scale parameter, a rotation angle parameter, a horizontal shifting parameter and a vertical shifting parameter between the coordinate $(u_i,v_i)$ of the $i^{th}$ feature point of the image and the coordinate $(x_j,y_j)$ of the $j^{th}$ feature of one of the at least one candidate reference image.

14. The non-transitory machine-readable medium of claim 11, wherein the electronic calculating apparatus transforms the at least one candidate reference image according to the following equation:

$$\begin{bmatrix} s \\ f_x \\ f_y \end{bmatrix} = \begin{bmatrix} x_1^2 + y_1^2 & x_1 & y_1 \\ x_2^2 + y_2^2 & x_2 & y_2 \\ \vdots & \vdots & \vdots \\ x_N^2 + y_N^2 & x_N & y_N \end{bmatrix}^{-1} \begin{bmatrix} x_1 u_1 + y_1 v_1 \\ x_2 u_2 + y_2 v_2 \\ \vdots \\ x_N u_N + y_N v_N \end{bmatrix}$$

where, $(u_i, v_i)$ is a coordinate of an $i^{th}$ feature point of the image, $(x_j, y_j)$ is a coordinate of a $j^{th}$ feature of one of the at least one candidate reference image, s, $f_x$ and $f_y$ are a scale parameter, a horizontal shifting parameter and a vertical shifting parameter between the coordinate $(u_i, v_i)$ of the $i^{th}$ feature point of the image and the coordinate $(x_j, y_j)$ of the $j^{th}$ feature of one of the at least one candidate reference image.

15. The non-transitory machine-readable medium of claim 11, wherein the electronic calculating apparatus generates the specific interaction index map of the image according to the following equation:

$$B(x, y) = \underset{c=\{1,2,\ldots L\}}{\mathrm{argmax}}\ p(c);$$

where, the $B(x,y)$ is a corresponding index value of a coordinate on the specific interaction index map, $(x,y)$ is the coordinate, L is the total number of types of index values, c is an index value of at least one transformed candidate reference image at the coordinate, and $p(c)$ is an accumulated number of the index values.

* * * * *